United States Patent [19]

Ostergren et al.

[11] 4,451,004
[45] May 29, 1984

[54] FLAIL HEAD

[75] Inventors: William F. Ostergren, Terre Hill; Albert J. Ipnar, East Earl, both of Pa.

[73] Assignee: Sperry Corporation, New Holland, Pa.

[21] Appl. No.: 32,203

[22] Filed: Apr. 23, 1979

[51] Int. Cl.³ ............................................... A01C 3/06
[52] U.S. Cl. .................................................. 239/658
[58] Field of Search ...................... 239/658, 662, 670; 56/29; 172/45; 414/324, 507; 222/228, 227; 366/309, 311, 312, 313; 15/246.5, 89, 91, 92

[56] References Cited

U.S. PATENT DOCUMENTS

| 3,038,643 | 6/1962 | Van DerLely et al. | 222/228 X |
| 3,402,542 | 9/1968 | Johnston | 56/29 |
| 3,419,222 | 12/1968 | Lepp et al. | 239/658 |
| 3,640,473 | 2/1972 | Webb et al. | 239/658 |
| 3,980,239 | 9/1976 | Lee | 239/658 |
| 4,097,001 | 6/1978 | Brackbill et al. | 239/658 |

Primary Examiner—John J. Love
Attorney, Agent, or Firm—Larry W. Miller; Darrell F. Marquette; Frank A. Seemar

[57] ABSTRACT

A resilient extension for the flail elements of a flail-type material spreader is disclosed wherein the resilient extension is affixed to each respective flail head such that it sweepingly engages the interior surface of the material holding tank to substantially completely discharge all of the material from within the tank. The resilient extension can be in the form of a flat planar member or of a cross-shaped configuration. This substantially complete discharge of material eradicates the starter flail "dead-head" problem by eliminating the mass of material which accumulates at the bottom of the tank. A resilient extension for the starter flails is also disclosed.

13 Claims, 8 Drawing Figures

U.S. Patent May 29, 1984 4,451,004
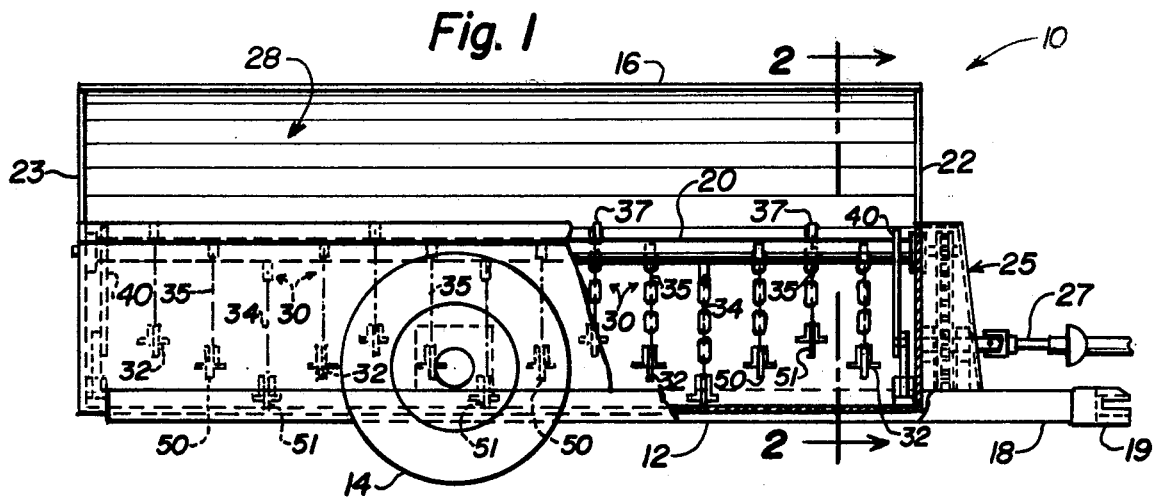
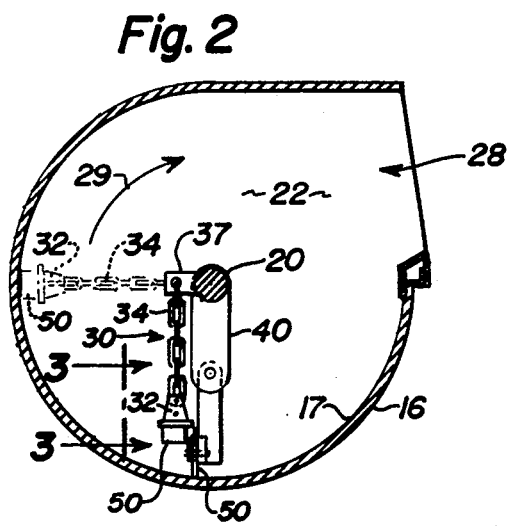 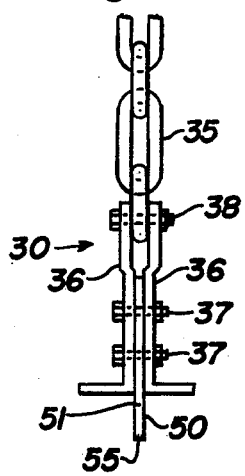 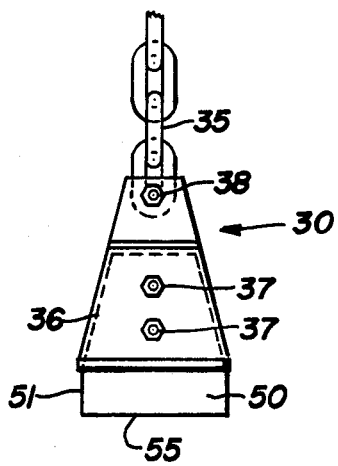
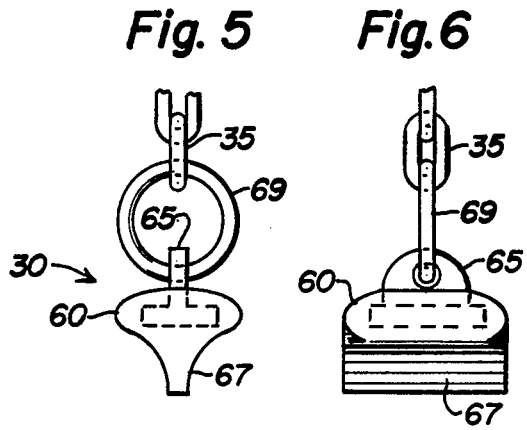 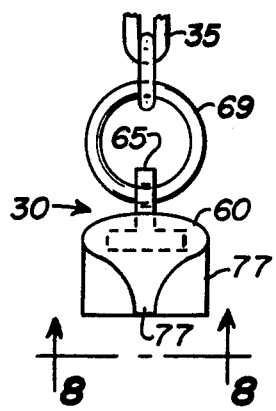 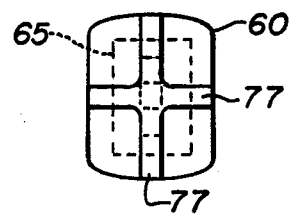

FLAIL HEAD

BACKGROUND OF THE INVENTION

The present invention relates generally to flail-type material spreaders and, more particularly, to resilient flail extensions to improve the discharge capabilities of the flail spreader.

Flail-type material spreaders, commonly referred to as "flail spreaders," were designed as an alternative to the conventional box spreaders in response to the latter's inability to adequately handle, transport and discharge liquid or semi-liquid manures. Flail spreaders usually have a cylindrical tank with a longitudinally extending shaft therethrough. Flail elements are attached to the rotor shaft for rotation therewith and, thereby, discharge the material through an opening in the side of the tank.

Generally, flail spreaders include at least one starter flail, usually adjacent the front and/or rear endwall of the cylindrical tank, for initiating the discharge process. A more detailed description of the construction and purpose of the starter flails and the arrangement of flail elements can be found in U.S. Pat. No. 3,980,239, granted to John L. Lee on Sept. 14, 1976, and in U.S. Pat. No. 3,640,473, granted to Bryant F. Webb et al. on Feb. 8, 1972.

The flail elements normally include rigid flail heads which are connected to the rotor shaft by flexible links, usually chains. As described in U.S. Pat. No. 4,097,001, granted to Warren H. Brackbill et al. on June 27, 1978, these rigid flail heads are maintained at a reasonable distance from the interior surface of the cylindrical tank to prevent damage thereto. This distance between the flail head and the cylindrical tank prevents a complete discharge of material.

Particularly in slurry type manures, material will build up adjacent the wall of the cylindrical tank between the tank and the flail head. After the rotation of the rotor shaft has been halted, this material build-up will slump down and accumulate at the bottom of the tank. Under sufficiently cold temperature conditions, this accumulation of material will freeze into a solid mass.

Since the starter flail is normally a rigid member and, therefore, restricted in its ability to avoid this frozen mass, a "dead-head" condition may result whereby the starter flail impacts this frozen mass in such a manner as to be unable to rotate without excessive amounts of power. Such excessive power requirements have resulted in damage to structural components and/or drive system components.

Rather than taking the approach of redesigning the starter flail so as to avoid this "dead-head" problem, this invention effectively eradicates the problem by substantially cleaning the tank of material and eliminating the frozen mass of material at the bottom of the tank.

SUMMARY OF THE INVENTION

It is an object of this invention to overcome the aforementioned disadvantages of the prior art flail spreaders by providing a resilient extension for the flail head of the flail spreader to sweepingly engage the interior surface of the material holding tank.

It is a feature of this invention to substantially completely clean out the tank of a flail-type material spreader and thereby eliminate an accumulated mass of undischarged material at the bottom of the tank.

It is an advantage of this invention that a resilient extension for the flail head of flail spreader is provided which will wear away against the interior wall of the tank as the flexible link of the flail element elongates.

It is another object of this invention to eradicate the problem of the starter flail "dead-heading" a frozen mass of material accumulated at the bottom of the flail spreader tank.

It is still another object of this invention to provide a resilient extension for the flail head of a flail spreader which will present a broad discharging face with respect to the material being discharged no matter what angle the flail head is turned during rotation thereof with the rotor shaft.

It is another advantage of this invention wherein readily visual means of determining the amount of elongation of the flexible length portion of the flail element is provided.

It is a further object of this invention to provide for a design which can be manufactured and utilized simply and inexpensively.

These and other objects, features and advantages are accomplished according to the instant invention by providing a resilient extension for the flail elements of a flail-type material spreader wherein the resilient extension is affixed to each respective flail head such that it sweepingly engages the interior surface of the material holding tank to substantially completely discharge all of the material from within the tank. The resilient extension can be in the form of a flat planar member of of a cross-shaped configuration. This substantially complete discharge of material eradicates the starter flail "dead-head" problem by eliminating the mass of material which accumulates at the bottom of the tank. A resilient extension for the starter flails is also provided

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side view of a flail-type material spreader partialy broken away with the rotor shaft at rest;

FIG. 2 is a cross sectional view of a cylindrical tank as shown in FIG. 1 taken along line 2—2, the phantom lines showing the positional relationship of the flail element during operation with the rotor shaft in motion;

FIG. 3 is an enlarged side view of the flail head shown in FIG. 2 corresponding to line 3—3;

FIG. 4 is a frontal view of the flail head seen in FIG. 3;

FIG. 5 is a side view of a molded flail head integrally embodying the invention, this flail head being an alternative embodiment of the flail head shown in FIG. 3;

FIG. 6 is a frontal view of the alternative embodiment of the flail head shown in FIG. 5;

FIG. 7 is a side view of a third embodiment of the invention, the front view being identical to the side view; and FIG. 8 is a bottom view of the embodiment of the flail head seen in FIG. 7 corresponding to line 8—8.

DETAILED DESCRIPTION OF THE INVENTION

Referring now to the drawings and particularly to FIG. 1, a side view of a flail-type material spreader embodying the invention can be seen. The flail spreader 10 is generally comprised of a frame structure 12, supporting wheels 14 and a generally cylindrical tank 16. The frame structure 12 is supported on wheels 14 (only one of which is shown in FIG. 1) and extends to form the tongue 18 which is adapted, in the form of a clevis 19, to be attached to a tractor (not shown) for towing.

A rotor shaft 20 extends in a fore-and-aft direction within the tank 16 between the front endwall 22 and the rear endwall 23. The rotor shaft 20 is rotatably mounted and connected to a drive system 25 for rotation thereof. The rotational power is supplied by the towing tractor (not shown) through the power take-off (also not shown) and transferred to the drive system 25 by the power input shaft 27.

A plurality of flail elements 30 are connected to the rotor shaft 20 for rotation therewith inside the tank 16 to discharge material. The flail elements 30 are generally comprised of a rigid flail head 32 and a flexible link 34, usually a length of chain 35, interconnecting the flail head 32 and the rotor shaft 20. One known means for attaching the flail elements 30 to the rotor shaft 20 is by attaching the chain 25 to a tab 37 affixed to the rotor shaft 20 (as seen best in FIG. 2).

At least one starter flail 40 is usually attached to the rotor shaft 30 adjacent either the front endwall 22 or the rear endwall 23. As is well known in the art, the general purpose of the starter flail 40 is to initiate the discharge process. Details regarding the purpose and function of the starter flails may be found in U.S. Pat. No. 3,980,239. Normally, a starter flail 40 will be placed adjacent each endwall 22, 23 to start the discharge process from both ends simultaneously.

After loading material into the cylindrical tank 16 and transporting it to the site upon which the material is to be discharged, the operator provides rotatonal power to the drive system 25 which rotates the rotor shaft 20, and the fail elements 30 and starter flails 40 which are attached thereto, to discharge the material through opening 28 in the cylindrical tank 16. It should be noted that prior to this invention, the flail heads 32 rotated with the rotor shaft 20 within the tank 16 preferably without contacting the tank 16. As is noted in U.S. Pat. No. 4,097,001, when the fall head 32 impacted the tank 16 structural damage usually was the result.

Referring now to FIG. 2, as a cross sectional view of the cyindrical tank 16 can be seen. The starter flail 40 is shown adjacent the front endwall 22. One flail element 30 is shown at rest without the rotor shaft 20 being in motion by solid lines, while the phantom lines depicted the relative position of the flail element 30 during the discharge process with the rotor shaft turning. In this particular view the tab 37 is shown as being stopped in a side position substantially perpendicular to the ground. Resilient extensions 50 in the embodiment better seen in FIGS. 3 and 4, are shown connected to both the flail head 32 and the end of the starter flail 40.

During rotation of the rotor shaft 20, these resilient extensions 50 sweepingly engage the interior surface 17 of the cylindrical tank 16 to facilitate the substantially complete cleaning of the tank 16, as seen in phantom in FIG. 2. The flexible link 34 is shown to be in the form of a length of chain 35 as in FIG. 1. The arrow 29 shows the direction of rotation of the rotor shaft 20, flail elements 30 and starter flails 40 to discharge the material through the discharge opening 28.

FIGS. 3 and 4 show the preferred embodiment of the flail head 32 and the resilient extention 50 combination.

The flail head 32 is constructed from two substantially identical L-shaped halves 36 which are connected back to back by one or more bolts 37. Another bolt 38 attaches the chain 35 to the flail head 32. The resilient extension 50 is placed between the top L-shaped halves 36 and maintained in position by bolts 37. One skilled in the art will readily realize that two bolts 37 will provide for a more stable combination.

The tip 55 of the resilient extension 50 sweepingly engages the interior surafce 17 of the cylindrical tanks 16. The tip 55 will wear due to the constant contact with the tank 16; however, the elongation of the flexible link 34 will compensate for the wear and generally maintain the tip 55 against the tank 16. The problem of elongation is thoroughly discused in U.S. Pat. No. 4,097,001 and a more detailed description can be found therein. The resilient extension 50 can be constructed from practically any material which is somewhat resilient and will wear with the elongation of flexible link 34. One appropriate material for constructing the resilient extension has been found to be a portion of tire carcass. The L-shaped halves 36 can be made of steel or any other suitable material to form a rigid body.

FIGS. 5 and 6 display an alternative embodiment of the invention wherein the flail head 30 is molded. A rubber flail head body 60 is molded around a T-shaped steel (or other suitable rigid material core member 65. An extension tip 67, projecting downwardly from the body 60, is of a shape somewhat similar to the resilient extension 50 and the tip 55, as seen in FIG. 3 and 4, and functions identically. The extension tip 67 sweepingly engages the interior surface 17 of the cylindrical tank 16 and wears according to the elongation of the flexible link 34. A ring member 69 is shown interconnecting the flail head 30 and the flexible link 34.

FIGS. 7 and 8 reveal a modification to the embodiment displayed in FIGS. 5 and 6. Instead of the single planar extension tip 67 as seen in FIGS. 5 and 6, this third embodiment incorporates a cross-shaped tip 77. Because the flail head 30 tends to rotate about an axis according to the flexible link 34 during the discharge process, the extension tip 67 does not always strike the material in the most effective manner. The use of a cross-shaped tip 77 provides for a substantially uniform surface for striking and discharging the material no matter how the flail head 30 is turned.

It has been found that the placement of the flail heads 30 in the position seen in FIGS. 1 and 2 with the narrow edge 51 of the resilient extension 40 being the leading edge sufficiently cleans the tank 16 of material to solve the aforementioned "dead-head" problem. However, it should be obvious to one skilled in the art that turning the flail head 30 such that the view seen in FIG. 4 strikes and discharges the material would be a more efficient use of the invention disclosed herein.

An additional advantage of this invention would be that the operator can determine the extent of elongation of each flexible link 34 by observing the amount of wear on the flexible extension 50. At the advantageous time, the operator could replace a worn flexible extension 50 and shorten the flexible link 34 accordingly.

It will be understood that various changes in the details, materials, steps and arrangement of parts which have been described and illustrated in order to explain the nature of the invention will occur to and may be made by those skilled in the art upon a reading of the disclosure within the principles and scope of the invention.

Having thus described the invention, what is claimed is:

1. A flail head to be affixed to the flexible link of a flail spreader, said flail spreader having a generally cylindrical holding tank with a discharge opening therein and an at least partially circular cross sectional configuration normal to said discharge opening, said flail head being operable to discharge material from within said holding tank through said discharge opening, said flail head comprising:

a rigid body having a first end and an opposing second end, said first end including means for connecting said body to the flexible link, said second end being spaced from the interior surface of said holding tank; and a resilient member affixed to said body adjacent said second end and extending away therefrom opposite said first end, said resilient member including tip means for sweepingly engaging the entire circularly cross sectional portion of said holding tank adjacent said tip means during operation of said flail head to discharge material, said tip means being operable to propel material situated between said second end of said body and the interior surface of said holding tank through said discharge opening such that said holding tank is substantially completely emptied of material.

2. The flail head of claim 1 wherein said rigid body is comprised of two substantially identical L-shaped members, the long legs of said L-shaped members being connected such that the short legs thereof are adjacent and extend away from each other, said resilient member being affixed between said L-shaped members.

3. The flail head of claim 2 wherein said resilient member is an elongated substantially planar member aligned substantially parallel to the long legs of said L-shaped members.

4. The flail head of claim 1 wherein said rigid body and said resilient member are integral.

5. The flail head of claim 4 wherein said resilient member is molded around said rigid body, said tip means being integrally connected to said resilient member and forming a shaped tip for facilitating the discharge of material from said holding tank, said tip being adjacent said second end and extending away from said first end, such that said tip engages the interior surface of said holding tank during the material discharge operation.

6. The flail head of claim 5 wherein said tip is narrower than said body and substantially planar in configuration.

7. The flail head of claim 5 wherein said tip has a cross-shaped cross sectional configuration perpendicular to a plane through said first end and said second end.

8. The flail head of claim 6 or 7 wherein said resilient member is made of rubber.

9. A flail-type material spreader comprising:

a mobile frame structure adapted for movement across the fields;

a generally cylindrical material holding tank mounted on said frame structure, said cylindrical tank having front and rear endwalls and, a discharge opening between said endwalls and an at least partially circular cross sectional configuration;

a rotor shaft rotatably mounted within said tank and extending between said endwalls longitudinally to said opening;

at least one starter flail mounted on said rotor shaft for initiating the unloading of material from said tank;

a plurality of spaced apart flail elements connected to said rotor shaft and rotatable therewith for discharge of material through said discharge opening, each said flail element including a flail head and a flexible link interconnecting said flail head and said rotor shaft, said flail head being positioned such that during rotation thereof said flail head does not contact said material holding tank;

a resilient member affixed to each respective said flail head, each said resilient member including tip means for sweepingly engaging the entire circularly cross sectional portion of the interior surface of said material holding tank adjacent said tip means during rotation of said flail elements with said rotor shaft and propelling material situated between said flail head and the interior surface of said material holding tank through said discharge opening to facilitate the substantially complete discharge of material from said tank; and drive means to rotate said rotor shaft.

10. The flail spreader of claim 9 wherein said at least one starter flail includes a resilient extension connected thereto, said resilient extension having tip means for sweepingly engaging the interior surface of said cylindrical tank and propelling material adjacent thereto upon rotation of said rotor shaft.

11. The flail spreader of claim 9 wherein said resilient member is an elongated substantially planar member.

12. The flail spreader of claim 9 wherein said tip means engages the interior surface of said cylindrical tank with a cross-shaped configuration.

13. The flail spreader of claims 11 or 12 wherein said resilient member is integrally formed with said flail head.

* * * * *